(12) United States Patent
Bilodeau et al.

(10) Patent No.: US 9,410,061 B2
(45) Date of Patent: Aug. 9, 2016

(54) TACKIFIER AND MODIFIED STARCH FORMULATION, SYSTEM AND METHOD

(71) Applicant: RANTEC CORPORATION, Ranchester, WY (US)

(72) Inventors: Rick Bilodeau, Dayton, WY (US); Lloyd Marsden, Sheridan, WY (US)

(73) Assignee: RANTEC CORPORATION, Ranchester, WY (US)

( * ) Notice: Subject to any disclaimer, the term of this patent is extended or adjusted under 35 U.S.C. 154(b) by 0 days.

(21) Appl. No.: 14/851,301

(22) Filed: Sep. 11, 2015

(65) Prior Publication Data

US 2016/0002503 A1    Jan. 7, 2016

Related U.S. Application Data

(62) Division of application No. 13/745,450, filed on Jan. 18, 2013, now Pat. No. 9,150,713.

(60) Provisional application No. 61/587,978, filed on Jan. 18, 2012.

(51) Int. Cl.
| | | |
|---|---|---|
| *C08L 3/00* | (2006.01) | |
| *C08L 3/02* | (2006.01) | |
| *C09J 103/04* | (2006.01) | |

(52) U.S. Cl.
CPC ............... *C09J 103/04* (2013.01); *C08L 3/00* (2013.01); *C08L 3/02* (2013.01)

(58) Field of Classification Search
CPC .................................... C08L 3/00; C08L 3/02
USPC ............................. 536/102; 524/47; 162/166
See application file for complete search history.

(56) References Cited

FOREIGN PATENT DOCUMENTS

| CN | 102010678 | | 4/2011 |
|---|---|---|---|
| CN | 102010678 A | * | 4/2011 |

* cited by examiner

*Primary Examiner* — Kelechi Egwim

(57) ABSTRACT

This disclosure describes formulations, systems and methods for a novel tackifier. The novel tackifier is composed of a modified starch and an acrylamide.

12 Claims, 18 Drawing Sheets

Table 1. Tackifier Formulation

| Component | Description | Range (% by weight) |
|---|---|---|
| Modified Starch | Derived from any vegetable source, including corn, wheat or other grains, potato or tapioca and treated with an enhancer | 80 to 99 |
| Acrylamide | | 1 to 20 |
| Xanthan Gum | Alternative embodiment | 10 to 30 |

FIG. 1

TABLE 2. Embodiment of a Dispersion Modified Starch Component of the Tackifier

| Dispersion Modified Starch Component of Spec Tack | |
|---|---|
| Starch | 96% |
| Water | 1.45% |
| Glycerin | 0.54% |
| Sodium Metaborate | 1.00% |
| Lime, Calcium Hydroxide | 0.1% |
| Fumaric Acid | 0.8% |
| Surfactant, Polyethylene Glycol Monoleate, MO-7 | 0.1% |

FIG. 2

Test Bed in Position Under Rain Simulator

Prepared Test Bed

Test Bed with Simulated Rain Occuring

Typical Prepared Soil Best with Tackifier Applied

Control vs. F Prepared Bed    FIG. 11

Control vs. F 1st Event  FIG. 12

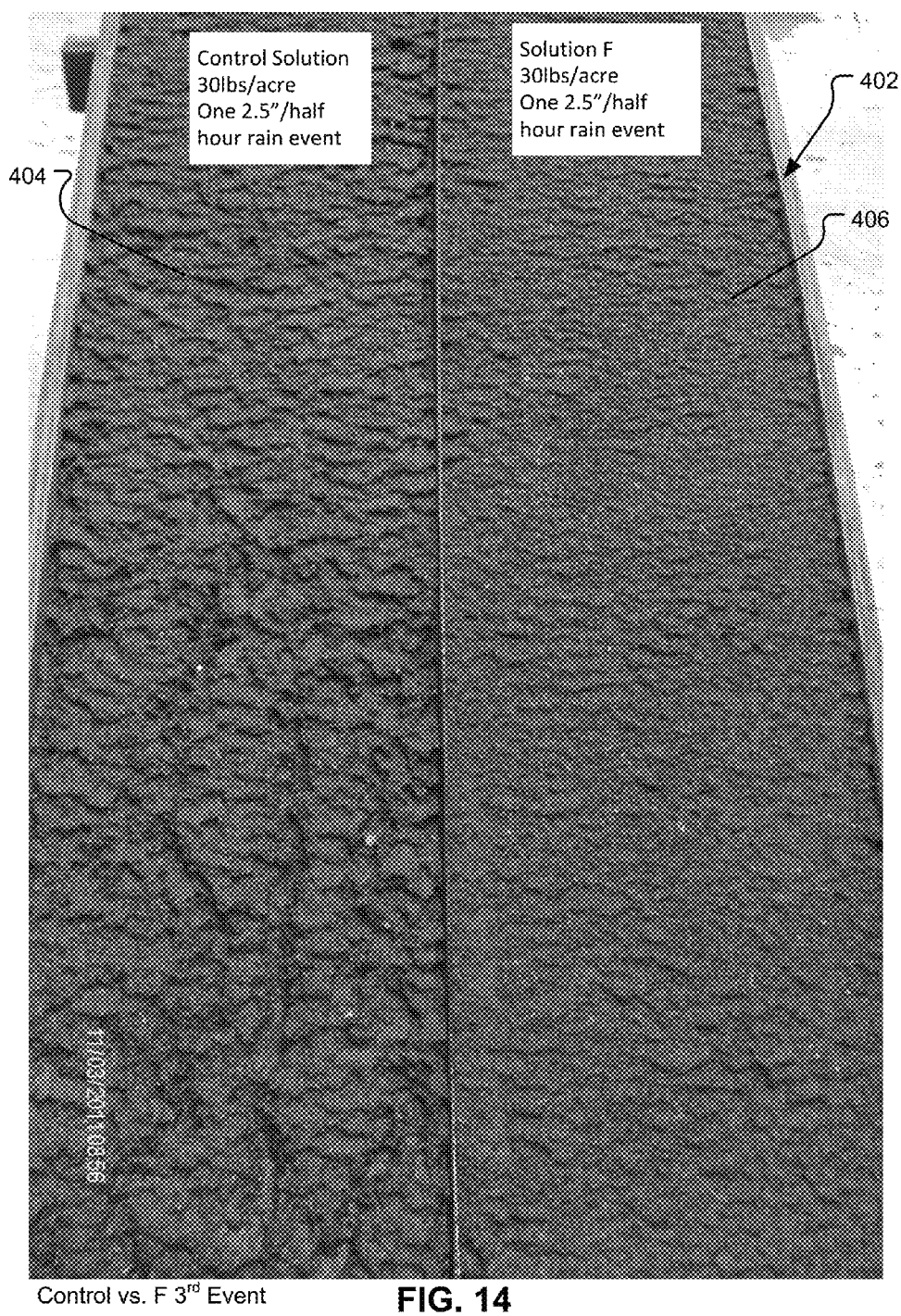
Control vs. F 3rd Event    FIG. 14

Table 6. Results of First Event

| | |
|---|---|
| TEST BED | First event |
| TEST DATE SPRAYED: | 10/28/2011 |
| DRY TIME: | |
| DATE | 10/31/2011  1ST RAIN EVENT |
| START TIME: | 2:30 PM |
| END TIME: | 3:00 PM |
| RATE, INCHES/HOUR: | 5 |
| ACTUAL INCHES PRECIP: | 2.5 |

SIDE A
PRODUCT: Guar Gum J3000
RATE: 30 LB/Acre
0.2% Solution, Apply 933 Grams
RUNOFF

| TIME, MIN | TOTAL, kg | BUCKET TARE, KG | DRY SEDIMENT, kg | WATER WT, kg | % WATER ABSORPTION |
|---|---|---|---|---|---|
| 10 | 1.2 | 0.95 | 0 | 0.25 | 89.32% |
| 20 | 1.3 | 1.05 | 0 | 0.25 | 88.97% |
| 30 | 5.15 | 1.1 | 0 | 4.05 | 56.32% |
| | | | | | |
| | | | | | |
| | | | | | |
| TOTAL | 7.65 | 3.1 | 0 | 4.55 | 78.37% |

SIDE B
PRODUCT: SpecTac
RATE: 30 LBS/Acre
0.2% Solution, Apply 933 Grams
RUNOFF

| TIME, MIN | TOTAL, kg | BUCKET TARE, KG | DRY SEDIMENT, kg | WATER WT, kg | % WATER ABSORPTION |
|---|---|---|---|---|---|
| 10 | 2.65 | 1.1 | 0 | 1.55 | 77.52% |
| 20 | 3.7 | 1 | 0 | 2.7 | 68.62% |
| 30 | 7.3 | 1 | 0 | 6.3 | 38.08% |
| 40 | | | | | |
| 50 | | | | | |
| 60 | | | | | |
| TOTAL | 13.65 | 3.1 | 0 | 10.55 | 61.40% |

FIG. 15

Table 7. Results of Second Event

| 2nd Event | | | | | |
|---|---|---|---|---|---|
| DATE SPRAYED: | | 28-Oct | | | |
| DRY TIME: | | | | | |
| DATE | ######## | 2ND RAIN EVENT | | Test bed still wet from first event | |
| | START TIME: | 1:40 PM | | | |
| | END TIME: | 2:10 | | | |
| | RATE, INCHES/HOUR: | 5 | | | |
| | ACTUAL INCHES PRECIP: | 2.5 | | | |

SIDE A
PRODUCT: Guar Gum J3008
RATE: 30 LB Acre
0.2% Solution, Apply 933 Grams
RUNOFF

| TIME, MIN | TOTAL, kg | BUCKET TARE, KG | DRY SEDIMENT, kg | WATER WT, kg | % WATER ABSORBTION |
|---|---|---|---|---|---|
| 10 | 6.6 | 0.95 | 0.0409 | 5.9091 | 44.02% |
| 20 | 12.6 | 1.05 | 0.1821 | 11.3679 | -6.87% |
| 30 | 15.1 | 1.1 | 0.0772 | 13.9228 | -28.07% |
| | | | | | |
| | | | | | |
| | | | | | |
| TOTAL | 34.3 | 3.1 | 0.3002 | 30.8998 | 3.03% |

SIDE B
PRODUCT: SpecTac
RATE: 30 LB Acre
0.2% Solution, Apply 933 Grams
RUNOFF

| TIME, MIN | TOTAL, kg | BUCKET TARE, KG | DRY SEDIMENT, kg | WATER WT, kg | % WATER ABSORBTION |
|---|---|---|---|---|---|
| 10 | 8.3 | 1.1 | 0.0117 | 7.1883 | 29.60% |
| 20 | 10.4 | 1 | 0.0274 | 9.3726 | 11.79% |
| 30 | 13.1 | 1 | 0.156 | 11.944 | -11.11% |
| 40 | | | | | |
| 50 | | | | | |
| 60 | | | | | |
| TOTAL | 31.8 | 3.1 | 0.1951 | 28.5049 | 10.10% |

FIG. 16

Table 8. Results of Third Event

| 3rd Event | | | | | Test bed still wet from 2nd event |
|---|---|---|---|---|---|
| DATE | ######## | 3RD RAIN EVENT | | | |
| | START TIME: | 2:30 PM | | | |
| | END TIME: | 3:00 PM | | | |
| | RATE, INCHES/HOUR: | 5 | | | |
| | ACTUAL INCHES | | | | |
| | PREOP: | 2.5 | | | |

SIDE A
PRODUCT: Guar Gum 13000
RATE: 30 lbs/acre
0.2% Solution, Apply 935 Grams
RUNOFF

| TIME, MIN | TOTAL, kg | BUCKET TARE, KG | DRY SEDIMENT, kg | WATER WT, kg | % WATER ABSORPTION |
|---|---|---|---|---|---|
| 10 | 8.6 | 0.95 | 0.0722 | 7.5778 | 27.06% |
| 20 | 14.55 | 1.05 | 0.2231 | 13.2769 | -23.41% |
| 30 | 16.2 | 1.1 | 0.1448 | 14.9552 | -37.48% |
| | | | | | |
| | | | | | |
| | | | | | |
| TOTAL | 39.35 | 3.1 | 0.4401 | 35.8099 | -11.25% |

SIDE B
PRODUCT: SpecTac
RATE: 30 lbs/acre
0.2% Solution, Apply 935 Grams
RUNOFF

| TIME, MIN | TOTAL, kg | BUCKET TARE, KG | DRY SEDIMENT, kg | WATER WT, kg | % WATER ABSORPTION |
|---|---|---|---|---|---|
| 10 | 9.5 | 1.1 | 0.0241 | 8.38 | 19.48% |
| 20 | 10.9 | 1 | 0.0374 | 9.87 | 7.55% |
| 30 | 10.4 | 1 | 0.0182 | 9.38 | 11.75% |
| 40 | | | | | |
| 50 | | | | | |
| 60 | | | | | |
| TOTAL | 32.8 | 3.1 | 0.0697 | 27.6303 | 12.92% |

FIG. 17

Table 9. SPECIFIC ADHESIVE STRENGTH

| LAB ID: | Spectac | DATE RECEIVED: | | CLIENT: | | | |
|---|---|---|---|---|---|---|---|
| DATE PADS MADE: | 07/22/11 | | | TYPE TACK: | MAT FIBER | TESTED BY: | RTB |
| DATE PADS PULLED: | 07/23/11 | | | TYPE MULCH: | | TIME SOL. HYD, min: | 15 |
| PAD SIZE: LENGTH, mm | WIDTH, mm | THICKNESS, mm | | LB/ACRE: | 4700 | OVEN TIME, HR/TEMP, F: | 200F OVERNIGHT |
| 101.6 | 76.2 | | | | | | |
| PULL WIDTH, mm | 101.6 | | | PAN SIZE L": | 13 | PAN SIZE W": | 9 |

| PAD NO: | DRY WT, g | TOTAL WT. BRK, g | TOTAL WT./ PAD WT, g | g OFF OF AVG: | | INGREDIENTS | lbs/acre | g |
|---|---|---|---|---|---|---|---|---|
| 1 | 3.83 | 2950 | 770 | -82 | | FIBER | 4369 | 37 |
| 2 | 4.24 | 3350 | 790 | -63 | | SPECTAC (BORATED) | 331 | 2.8 |
| 3 | 3.65 | 2900 | 795 | -58 | | | 0 | |
| 4 | 4.01 | 3250 | 810 | -42 | | | 0 | |
| 5 | 4.2 | 4450 | 1060 | 207 | | | 0 | |
| 6 | 4.96 | 4650 | 938 | 85 | | WATER 420 GRAMS | | |
| 7 | 4.31 | 4400 | 1021 | 168 | | | | |
| 8 | 4.39 | 2800 | 638 | -215 | | | | |
| Average Pad wt, g | 4.19875 | SAS AVG: | 853 | STD. DEV: | 132 | TOTAL | 4700 | |
| | | 95% UPPER: | 1112 | 95% LOWER: | 593 | | | |

TACKIFIER AND MODIFIED STARCH FORMULATION, SYSTEM AND METHOD

CROSS-REFERENCE TO RELATED APPLICATIONS

This application is a division of and claims priority to U.S. application Ser. No. 13/745,450, filed Jan. 18, 2013, now issued U.S. Pat. No. 9,150,713, which claims the benefit of U.S. Provisional Application No. 61/587,978, filed Jan. 18, 2012, which application is hereby incorporated by reference.

INTRODUCTION

Hydraulic application methods are widely utilized for application of ground surface treatments. These treatments may be utilized for control of fugitive dust, erosion loss of soil, re-vegetation of ground surfaces, control of ground surfaces after fire damage and for protection of soil and vegetation from evaporative water loss. An important component of the system is the tackifier. The tackifier provides essential fluid characteristics in the hydraulic mix and adhesion, strength and erosion resistant characteristics after application.

TACKIFIER AND MODIFIED STARCH FORMULATION, SYSTEM AND METHOD

This disclosure describes formulations, systems and methods for a novel and unique tackifier. The tackifier includes a modified starch and an acrylamide.

In part, this disclosure describes a tackifier formulation. The tackifier formulation includes a modified starch and an acrylamide. The modified starch is a vegetable derived starch treated with an enhancer. The enhancer is a solution containing a borate containing salt.

The disclosure, in part, also describes a method for producing a tackifier. The method includes: treating a starch with an enhancer to form a modified starch; and blending the modified starch with an acrylamide. The step of treating the starch includes at least one the following step:

applying a solution containing a borate containing salt to the starch.

These and various other features as well as advantages which characterize the systems and methods described herein will be apparent from a reading of the following detailed description and a review of the associated drawings. Additional features are set forth in the description which follows, and in part will be apparent from the description, or may be learned by practice of the technology. The benefits and features of the technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The following drawing figures, which form a part of this application, are illustrative of described technology and are not meant to limit the scope of the invention as claimed in any manner.

FIG. 1 illustrates Table 1 showing an embodiment a tackifier formula.

FIG. 2 illustrates Table 2 showing an embodiment of a modified starch component.

FIG. 14 illustrates a picture of the test bed of FIG. 13 after a third rain event.

FIG. 15 illustrates Table 6 showing the measured results from the test bed of FIG. 12 after the first rain event.

FIG. 16 illustrates Table 7 showing the measured results from the test bed of FIG. 13 after the second rain event.

FIG. 17 illustrates Table 8 showing the measured results from the test bed of FIG. 14 after the second rain event.

FIG. 18 illustrates Table 9 showing the experimental specifications and results of a performed tensile strength test.

DETAILED DESCRIPTION

Figure 3:
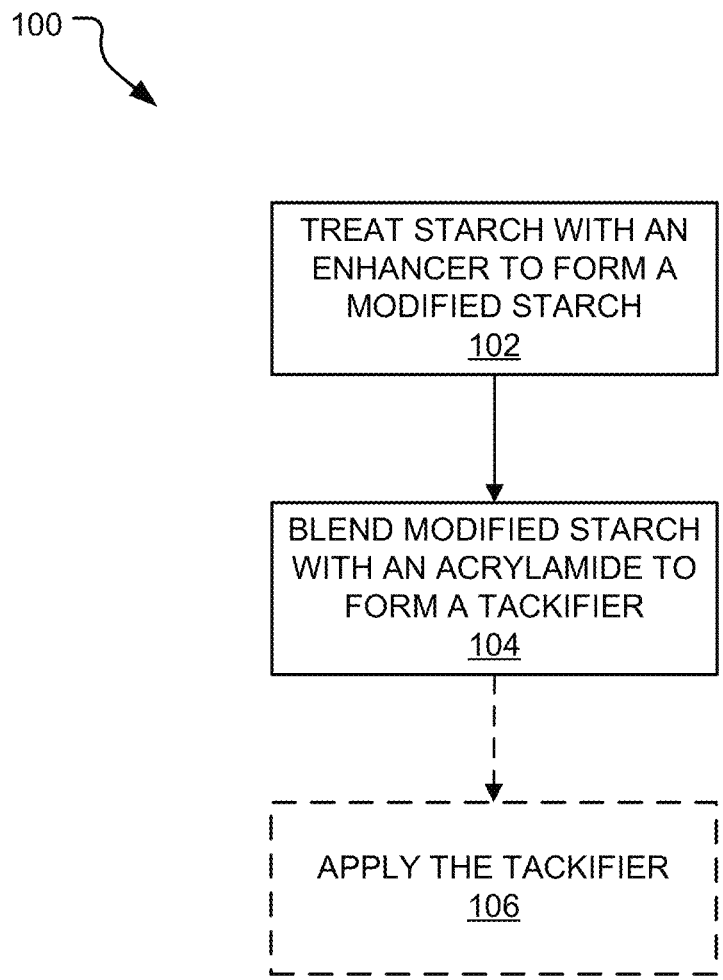
FIG. 3 illustrates an embodiment of a method for producing a tackifier.

This disclosure describes a novel and unique tackifier and method for making and using the same. The novel tackifier product can be processed and blended to provide for equal to and/or more optimum characteristics than existing tackifiers.

Before the tackifier composition and methods of making and using the same are disclosed and described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting. It must be noted that, as used in this specification, the singular forms "a," "an," and "the" include plural referents unless the context clearly dictates otherwise. Thus, for example, reference to "a lithium hydroxide" is not to be taken as quantitatively or source limiting, reference to "a step" may include multiple steps, reference to "producing" or "products" of a reaction should not be taken to be all of the products of a reaction, and reference to "reacting" may include reference to one or more of such reaction steps. As such, the step of reacting can include multiple or repeated reaction of similar materials to produce identified reaction products.

Hydraulic application is a process of mixing active components into water and subsequent application of that mixture to a ground surface by spraying or pouring. In some embodiments, the active components include, but are not limited to, mulch, fiber, fertilizers, seed, tackifiers, and system stabilizers. In other embodiments, the mulch may be ground wood, ground paper, composted materials, and/or natural or synthetic fiber. Tackifiers are water dispersible chemicals that provide for appropriate modifications of the hydraulic mixture during mixing, application and after application. The tackifier provides for modification of viscosity in the mixture for suspension of non-soluble components, reduction of friction in pumping and providing a suitable spray or other application pattern. After contact with the ground, the tackifier controls subsequent movement of the mixture aiding in keeping the wet mixture in place. Subsequently, the mixture dries in place and the tackifier becomes a dried bonding agent holding all the components together and holding the mixture to the ground surface. The tackifier also may provide resistance to wind erosion, water erosion, loss of mulch and fiber, and loss of water by evaporation.

The ground surface may be natural ground, excavated areas, stockpiles, areas previously covered with mulch, straw, compost or other ground areas. The equipment may be any system capable of mixing the appropriate mixture described and subsequently applying to a ground surface.

The tackifier may be the most expensive component in a hydraulic system for ground surface treatments. The tackifier is also an important ingredient for providing resistance to movement or loss of the dried surface treatment and for providing protection of the ground surface.

Tackifiers may be composed of water-soluble gums and polymers. Examples of water-soluble gums and polymers suitable for use herein are guar gum, derivatized guar gums, cellulose gums, starches, and psyllium husk powder. Each tackifier has its own strengths and weaknesses.

Desirable tackifier characteristics include: 1) Ease of mixing into water to produce a homogeneous slurry; 2) Addition of optimum viscosity to the fluid slurry; 3) Good control of application spray patterns; 4) Adequate adhesion to ground surface; 5) Adequate dry strength in the applied matrix to resist challenges; 6) Resistance to rewetting during environmental events; 7) Ultimate biodegradability; and 8) Reasonable economics.

The novel tackifier described herein is a blend of a modified starch (or starches) and acrylamide (or mixture of acrylamides). FIG. 1 illustrates an embodiment of a tackifier formulation. As illustrated in FIG. 1, in some embodiments, the novel tackifier includes a gum, such as guar gum, in addition to the modified starch.

The acrylamide includes a polyacrylamide copolymer. The acrylamide may be added in a portion from 0.5 to 20%. In some embodiments, the acrylamide is added in a portion from 1 to 2%. Any acrylamide may be used, such as polyacrylamides. Examples of suitable acrylamides include anionic charged polyacrylamides or polyacrylamide polyacrylate copolymers with an average molecular weight from 3 million to 25 million g/mol. and a charge density from 10% to 60%. Examples of commercial acrylamide products include: AN934XD from SNF, Inc., AF306 from Hychem, Inc., and Magnafloc 336 from CIBA.

In an embodiment, the starch is a modified starch. The starch may be sourced or derived from any natural vegetable source, such as corn, wheat, other grains, potato or tapioca. The starch is then processed and/or treated with an enhancer to improve the solubility and/or dispersability of the starch to form the modified starch. The enhancer improves the dispersability and/or solubility of the modified starch. For example, the modified starch is soluble in cold water. Further, the modified starch improves dispersibility when added to water by reducing and/or preventing the formation of non-dispersed lumps when mixed in water. Untreated fine starch powders may begin to hydrate or become sticky so quickly that the dry powder becomes encapsulated in a sticky hydrated powder forming a lump. The lump produced may be quite stable and may prevent the water from penetrating to the interior of the lump. In the industry, this formation is often called a fish-eye. To overcome lump formation, the starch is modified with an enhancer.

The enhancer may be one or more components. When the enhancer contains two or more components, each component may be applied separately, simultaneously, or overlap in application to the starch. The enhancer includes a solution containing borate salt. In some embodiments, the enhancer in addition to the solution containing a borate salt includes other components, such as a surfactant, a caustic metal hydroxide, a dry organic acid, and/or a dry flow enhancer.

As discussed above, the enhancer includes a solution containing borate salt. The borate salt complexes to the starch and prevent the starch from being soluble. The lack of solubility of the modified starch allows the starch to easily disperse when added to a liquid. The disperability of the modified starch created by the borate salt prevents and/or reduces the formation of lumps when compared to previously utilized tackifiers. The borate salt is dissolved in a solvent of water. In some embodiments, the solvent also includes a heavy alcohol. The solution containing borate salt may be formulated to maximize the amount of borate salt solubilized. For example, the use of a heavy alcohol in addition to water increases the solubility of the borate salt and reduces the amount of water added. The reduction in water reduces the amount of water found in the modified starch. Further, in some embodiments, the solution containing a borate salt is heated to increase the solubility of the borate salt. In some embodiments, the borate salt is a borax, sodium metaborate, zinc borate, a salt of boric acid, and/or or other borate source. The heavy alcohol may include a glycerin, ethylene glycol, propylene glycol, glycerol and/or other polyhydric alcohols. In some embodiments, the heavy alcohol is glycerin.

The solution containing the borate salt is applied to the starch. The borate salt is dissolved in the solvent in order to provide an efficient method of application of the borate salt to the starch. The solution containing a borate salt may be uniformly applied to the starch, such as via a spray bar. In some embodiments, the modified starch (starch plus the applied enhancer) contains from 0.5% to 6% by weight of the solution containing borate salt. In other embodiments, the modified starch (starch plus the applied enhancer) contains from 1.5% to 3% by weight of the solution containing borate salt. In further embodiments, the modified starch (starch plus the applied enhancer) contains from 1.5%, 2.0%, 2.5%, or 3.0% by weight of the solution containing borate salt.

In some embodiments, the modified starch contains from 0.5% to 3% by weight of the water (i.e., the total amount of water found in the modified starch). In other embodiments, the modified starch contains from 0.5% to 2% by weight of the water. In further embodiments, the modified starch contains from 0.7% to 1.6% by weight of the water. In some embodiments, the modified starch contains 0.72%, 0.96%, 1.20%, 1.44%. or 1.45% by weight of the water. In some embodiments, the modified starch contains from 0.08% to 1.5% by weight of the heavy alcohol. In other embodiments, the modified starch contains from 0.1% to 1% by weight of the heavy alcohol. In further embodiments, the modified starch contains from 0.2% to 0.6% by weight of the heavy alcohol. In some embodiments, the modified starch contains 0.54%. 0.27%, 0.36%. 0.45% or 0.54% by weight of the heavy alcohol. In some embodiments, the modified starch contains from 0.05% to 2.0% by weight of the borate salt. In other embodiments, the modified starch contains from 0.1% to 1.5% by weight of the borate salt. In further embodiments, the modified starch contains from 0.5% to 1.2% by weight of the borate salt. In some embodiments, the modified starch contains 1.00%, 0.51%, 0.50%, 0.68%. 0.85% or 1.02% by weight of the borate salt.

As discussed above, the solution containing the borate salt may be adjusted to maximize the amount of borate salt solubilized. Accordingly, a heavy alcohol may be utilized to increase the amount of borate salt solubilized in the solution and/or to decrease the amount of water found in the solution and/or the modified starch. Too much water in the modified starch may cause agglomeration of the dry powder form of the modified starch. Agglomeration of the modified starch causes the dry powder form of the modified starch to undesirably clump to itself or to undesirably stick together, which may impede dispersion and/or solubility of the modified starch. The use of a heavy alcohol in addition to water reduces and/or prevents the modified starch from clumping and/or sticking together by reducing the amount of water found in the modified starch when added to water.

As discussed above, the enhancer in addition to the solution containing a borate salt may also include a surfactant. The surfactant is utilized to improve the dispersion of the modified starch. A surfactant includes any surface active agent. In some embodiments, the surfactant is soap, a nonylphenol family, or a quaternary amine family. In some embodiments, the surfactant is a polyethylene glycol or modification thereof. The surfactant is applied to the starch after the application of the solution containing the borate salt. In some embodiments, the surfactant is applied via spraying. In further embodiments, the surfactant is applied via spraying during the blending process of the starch. Additionally, the surfactant may be uniformly applied, such as via a spray bar. In some embodiments, the surfactant is applied to the starch after an application of the solution containing a borate salt. In some embodiments the surfactant is applied 20 minutes after the application of the solution containing a borate salt to the starch. In other embodiments, the surfactant is applied 10, 15, 25, 30, 35 or 40 minutes after the application of the solution containing a borate salt to the starch. In some embodiments, the modified starch (starch and enhancer) contains from 0.05% by weight to 1% by weight surfactant. In other embodiments, the modified starch contains from 0.07% by weight to 0.3% by weight surfactant. In additional embodiments, the modified starch contains 0.1% by weight surfactant.

As discussed above, in some embodiments, the enhancer may include a caustic metal hydroxide. The caustic metal hydroxide is a dry metal. The caustic metal hydroxide is any readily soluble alkaline salt capable of very quickly producing a pH level of equal to or greater than 8.5 when the product is mixed in water. In some embodiments, the caustic metal hydroxide is a calcium hydroxide and/or lime. In other embodiments, the caustic metal hydroxide is a sodium hydroxide, sodium carbonate, potassium hydroxide, or blends with sodium bicarbonate. The caustic metal hydroxide creates a modified starch that when added to water has a pH of 8.5 or greater. Borate solubility increases as pH increases. The buffering of the pH to higher levels allows enough borate to be in solution to complex the starch. The caustic metal hydroxide is applied to the starch by blending or dry blending the caustic metal hydroxide into the starch. In some embodiments, the caustic metal hydroxide is applied to the starch after the application of the solution and/or the surfactant. In some embodiments, the caustic metal hydroxide is applied to the starch 10, 15, 20, 25, 30, 35 or 40 minutes after the application of the solution containing a borate salt or the surfactant. In some embodiments, the modified starch contains from 0.05% by weight to 1.0% by weight caustic metal hydroxide. In other embodiments, the modified starch contains from 0.07% by weight to 0.3% by weight caustic metal hydroxide. In additional embodiments, the modified starch contains 0.1% by weight caustic metal hydroxide.

As discussed above, the enhancer may include an organic acid. The organic acid is a dry acid that is slowly soluble in water and/or an alkaline environment. In some embodiments, the organic acid is fumaric acid, citric acid, and/or adipic acid. The dry organic acid is added to reduce the pH to <7.0 after the modified starch has been added to water and after the modified starch has dispersed in the water. The starch disperses while borate is present in an alkaline environment. The dry organic acid slowly dissolves into the water allowing for adequate dispersion time of the modified starch while in an alkaline environment. As soon as the pH is reduced to 7 or lower, the modified starch will hydrate as the borate complex is destroyed by the lower pH. For example, the modified starch may be soluble after 5 to 120 seconds. In some embodiments, the use of the organic acid forms a modified starch that is soluble after 15, 20, 25, 30, 35, 40, 45, 50, 55, 60, 65, 70, 75, or 80 seconds. In embodiments that utilize a modified starch without an organic acid, a mixture of modified starch and water will eventually drop in pH to allow the modified starch to hydrate as the borate complex is destroyed by the lower pH, but the drop in pH will take a longer period of time when compared to mixtures that utilized a modified starch with an organic acid.

The organic acid is applied to the starch by blending or dry blending the organic acid into the starch. In some embodiments, the organic acid is applied to the starch after the application of the solution, the surfactant, and/or the caustic metal hydroxide. In some embodiments, the caustic metal hydroxide and/or organic acid are applied to the starch 10, 15, 20, 25, 30, 35 or 40 minutes after the application of the solution containing a borate salt or the surfactant. In some embodiments, the modified starch contains from 0.1% by weight to 2% by weight organic acid. In other embodiments, the modified starch contains from 0.6% by weight to 1% by weight organic acid. In additional embodiments, the modified starch contains 0.8% by weight organic acid. In another embodiment, the organic acid is blended into the starch until a ratio is reached that provides a pH in a range from 5.5 to 7 when the modified starch is added to water.

In some embodiments, the enhancer may include a flow enhancer. The flow enhancer is any dry agent that reduces and/or prevents agglomeration or reduces dry powder flow in the modified starch. The reduction and/or prevention of agglomeration will prevent the modified starch from sticking to itself (i.e. forming dry clumps) that can impede dispersion and solubility of the modified starch when added to water. In some embodiments, the flow enhancer is micron sized silica or a fumed silica. In other embodiments, the flow enhancer is calcium stearate, zeolite, calcium silicate (E552), sodium aluminosilicate (E554), dicalcium phosphate (E341), talc, kaolin, potato starch, and/or microcrystalline cellulose (E460).

The flow enhancer is applied to the starch by blending or dry blending the flow enhancer into the starch. In some embodiments, the flow enhancer is applied to the starch after the application of the solution, the surfactant, the caustic metal hydroxide, and/or the organic acid. In an alternative embodiment, the caustic metal hydroxide, organic acid, and the flow enhancer are dry blended into the starch at substantially the same time after the application of the solution and the surfactant. In some embodiments, the caustic metal hydroxide, flow enhancer, and/or organic acid are applied to the starch 10, 15, 20, 25, 30, 35 or 40 minutes after the application of the solution containing a borate salt or the surfactant. In some embodiments, the modified starch contains from 0.05% by weight to 1% by weight flow enhancer. In other embodiments, the modified starch contains from 0.07% by weight to 0.3% by weight flow enhancer. In additional embodiments, the modified starch contains 0.1% by weight flow enhancer.

Additionally, in some embodiments, the modified starch improves dispersion by utilizing a specific formation process. In some embodiments, this process of forming the modified starch includes:

1. Prepare a solution of a borate salt, water, and glycerin such that the maximum amount of salt is solubilized.
2. This solution may be heated to increase the solubility of the borate salt.
3. The resulting solution is applied to the starch by spray bar or other suitable means to produce a uniform application.
4. A surfactant is sprayed onto the starch during the blending process.
5. A caustic metal hydroxide in a dry powder form is dry blended into the starch.
6. A dry organic acid is blended into the starch at a ratio such that after addition of the modified starch to water the pH is adjusted to the range of 5.5 to 7.0.
7. In some embodiments, a dry flow enhancer is blended into the starch.

For example, FIG. 2 illustrates a Table 2 showing an embodiment of the modified dry starch component of the tackifier.

As discussed above, after the starch has been fully modified, the resulting modified starch dry powder is blended with a dry powder form of an acrylamide, such as polyacrylamide.

FIG. 3 illustrates a method 100 for forming a tackifier. As illustrated, method 100 includes a treating operation 102. During the treating operation 102 of method 100, a starch is mechanically or manually treated with an enhancer to form a modified starch. As mentioned above, in an embodiment the starch may be sourced from a vegetable source, such as corn, wheat, other grains, potato, and/or tapioca.

Figure 4:
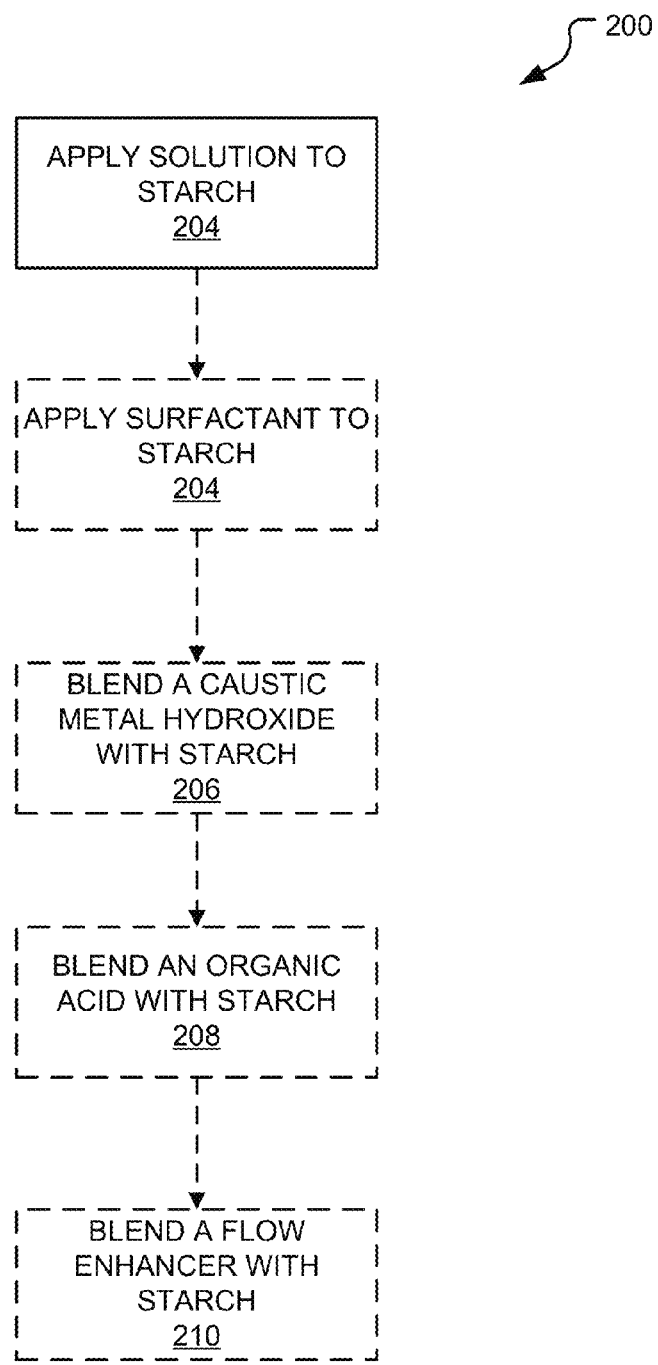
FIG. 4 illustrates an embodiment of a method for producing a modified starch.

An embodiment of a method 200 for producing the modified starch is illustrated in FIG. 4. Method 200 includes performing an apply solution operation 202. In some embodiments, method 200 includes performing one or more of the following operations: an apply a surfactant operation 204, a blend a caustic metal hydroxide operation 206, a blend an organic acid operation 208, and a blend a flow enhancer operation 210. The one or more of operations shown in method 200 may be performed in the order shown or in any other desirable order for improving the solubility and/or dispersability of the starch. In further embodiments, one or more of the operations shown in method 200 overlap in performance and/or or are performed simultaneously.

The apply solution operation 202 includes mechanically or manually applying a solution containing a borate salt to the starch. In some embodiments, the solution is heated to increase the solubility of the borate salt. In other embodiments, the solution is designed to maximize the amount of borate salt solubilized. In some embodiments, the apply solution operation 202 includes uniformly applying the solution to the starch. In some embodiments, the apply solution operation 202 utilizes a spray bar to apply the solution to the starch.

The concentrations of the borate salt, and water and/or alcohol utilized in the solution are discussed above. Further, the amount of solution applied to the starch during apply solution operation 202 is similar to amounts discussed above.

The apply a surfactant operation 204 includes mechanically or manually applying a surfactant to the starch. In some embodiments, the apply a surfactant operation 204 includes uniformly applying the surfactant to the starch. In further embodiments, the apply a surfactant operation 204 is performed during the blending process of the starch. In some embodiments, the apply a surfactant operation 204 utilizes a spray bar to apply the solution to the starch. In some embodiments, the apply a surfactant operation 204 is performed at least 10 minutes after the apply solution operation 202. In some embodiments, the apply a surfactant operation 204 is performed 10, 15, 20, 25, 30, 35, or 40 minutes after the apply solution operation 202. The amount and/or type of surfactant applied to the starch during apply a surfactant operation 204 is similar to amounts and/or types discussed above.

The blend a caustic metal hydroxide operation 206 includes mechanically or manually blending a dry powder caustic metal hydroxide into the starch. In some embodiments, the blending is a dry blending. In some embodiments, the blend a caustic metal hydroxide operation 206 is performed at least 10 minutes after the apply solution operation 202 or the apply a surfactant operation 204. In some embodiments, the blend a caustic metal hydroxide operation 206 is performed 10, 15, 20, 25, 30, 35, or 40 minutes after the apply solution operation 202 or the apply a surfactant operation 204. The amount and/or types of caustic metal hydroxide blended into the starch during the blend a caustic metal hydroxide operation 206 is similar to amounts and/or types discussed above.

The blend an organic acid operation 208 includes mechanically or manually blending a dry organic acid into the starch. In some embodiments, the blending is a dry blending. In some embodiments, the blend an organic acid operation 208 is performed at least 10 minutes after the apply solution operation 202 or the apply a surfactant operation 204. In some embodiments, the blend an organic acid operation 208 is performed 10, 15, 20, 25, 30, 35, or 40 minutes after the apply solution operation 202 or the apply a surfactant operation 204. The amount and/or type of organic acid blended into the starch during the blend an organic acid operation 208 is similar to amounts and/or types discussed above.

The blend a flow enhancer operation 210 includes mechanically or manually blending a dry flow enhancer into the starch. In some embodiments, the blending is a dry blending. In some embodiments, the blend a flow enhancer operation 210 is performed at least 10 minutes after the apply solution operation 202 or the apply a surfactant operation 204. In some embodiments, the blend a flow enhancer operation 210 is performed 10, 15, 20, 25, 30, 35, or 40 minutes after the apply solution operation 202 or the apply a surfactant operation 204. The amount and/or type of flow enhancer blended into the starch during the blend a flow enhancer operation 210 is similar to amounts and/or types discussed above.

In some embodiments, blend a caustic metal hydroxide operation 206, blend an organic acid operation 208, and the blend a flow enhancer operation 210 overlap in performance or are performed simultaneously at least 20 minutes after the performance of the apply solution operation 202 and/or the apply a surfactant operation 204. In some embodiments, blend a caustic metal hydroxide operation 206 and blend an organic acid operation 208 overlap in performance or are performed simultaneously at least 20 minutes after the performance of the apply solution operation 202 and/or the apply a surfactant operation 204. For example, the apply a surfactant operation 204 may be performed 20 minutes after the apply solution operation 202 and the blend a caustic metal hydroxide operation 206, blend an organic acid operation 208, and the blend a flow enhancer operation 210 may overlap in performance or may be performed simultaneously at least 20 minutes after the performance of the apply a surfactant operation 204. In another example, the apply a surfactant operation 204 may be performed 20 minutes after the apply solution operation 202 and the blend a caustic metal hydroxide operation 206 and the blend an organic acid operation 208 may overlap in performance or may be performed simultaneously at least 20 minutes after the performance of the apply a surfactant operation 204

Further, method 100 includes a blend an acrylamide operation 104. During the blend an acrylamide operation 104, an acrylamide is mechanically or manually blended with the modified starch to form a tackifier. In some embodiments, the blending is a dry blending. The amount and/or type of acrylamide blended into the modified starch during the blend an acrylamide operation 104 is similar to amounts and/or types discussed above.

In some embodiments, method 100 also includes an apply a tackifier operation 106. During the apply a tackifier operation 106, the tackifier is manually or mechanically mixed into water to form a hydraulic application mixture that is manually or mechanically applied to a ground surface. In some embodiments, the hydraulic application mixture is applied by spraying or pouring onto the ground surface. In some embodiments, the hydraulic application mixture also includes, mulch, fiber, fertilizers, seed, and/or system stabilizers. In some embodiments, the mulch is ground wood, ground paper, composted materials, and/or natural or synthetic fiber. In some embodiments, the ground surface is natural ground, excavated areas, stockpiles, areas previously covered with mulch, straw, compost or other ground areas. The mixing of the tackifier with water may be performed by any suitable mechanical or manual system capable of mixing the appropriate mixture and subsequently applying that mixture to a ground surface.

The tackifier provides for modification of viscosity in the hydraulic application mixture for suspension of the non-soluble components, reduction of friction in pumping, and a suitable spray or other application pattern. After contact with the ground, the tackifier controls subsequent movement of the mixture aiding in keeping the wet mixture in place. Once the hydraulic application mixture dries in place, the tackifier becomes a dried bonding agent holding all the components together and holding the hydraulic application mixture to the ground surface. The tackifier also may provide resistance to wind erosion, water erosion, loss of mulch and fiber, rewetting, and loss of water by evaporation.

The tackifier, the method for creating the tackifier, and the method of application of the tackifier as disclosed above provide for several advantages. For example, the tackifier formula is easily mixed in water producing a homogeneous solution due to the unique treatment of the starch powder with borate, surfactant, and dry acid. The tackifier formula is readily soluble and hydrates in water quickly to produce an appropriately viscous solution free of or substantially free of non-dispersed lumps.

Further, the tackifier is very resistant to re-wetting by water, such as would occur in rain events after a hydraulic application. Unmodified starch readily re-wets and may be removed by rain events. The addition of an acrylamide to the tackifier provides for water resistance.

Additionally, the tackifier disclosed herein is more economical than many other typically utilized tackifiers. Further, the tackifier disclosed herein is effective in reducing runoff, increasing soil water absorption and decreasing sediment runoff when compared to previously utilized tackifiers that do not utilized an acrylamide and/or a modified starch. The benefits of the tackifier and the benefits of the use of the tackifier in hydraulic application are documented in the experimental results shown below.

EXPERIMENTAL RESULTS

For analysis of the effectiveness of the disclosed tackifier, a representative embodiment of the tackifier was created and tested as described below. This representative tackifier formulation is identified as the "F Tackifier" product in the testing and analysis below in order to distinguish it from the control tackifier of J3000 Guar Gum against which it was compared.

The exact formula for the tested tackifier is illustrated in Table 3 below:

TABLE 3

Tackifier Formulation utilized In the Experimental Results

| F Tackifier Component | % by Weight |
| --- | --- |
| Dispersion Modified Starch Component of F Tackifier | 90 |
| Anionic Polyacrylamide, SNF | 10 |

The exact formula for the modified starch component utilized in the tested tackifier illustrated in Table 2 of FIG. 2.

A solution of water and F Tackifier (referred to herein as "Solution F"), as illustrated in Table 4 below, was prepared:

TABLE 4

Solution F

| Component | Weight, grams |
| --- | --- |
| Water | 1500 |
| F Tackifier | 3 | and was compared to the following solution of the control tackifier and water (referred to herein as "control solution"), as illustrated in Table 5 below:

TABLE 5

Control Solution

| Component | Weight, grams |
| --- | --- |
| Water | 1500 |
| J3000 Guar Gum (Control Tackifier) | 3 |

A spray gun was used to apply 935 grams of the above Solution of F Tackifier and water (Table 4) to an area of 1.0 feet×6.0 feet of prepared soil on the test bed 402. The area is exactly one-half the width of the test bed 402. The same spray gun was used to apply 935 grams of the control formulation (Table 5) to the other one-half of the test bed 402. A divider is placed between the two sections of the test bed 402.

Figure 5:
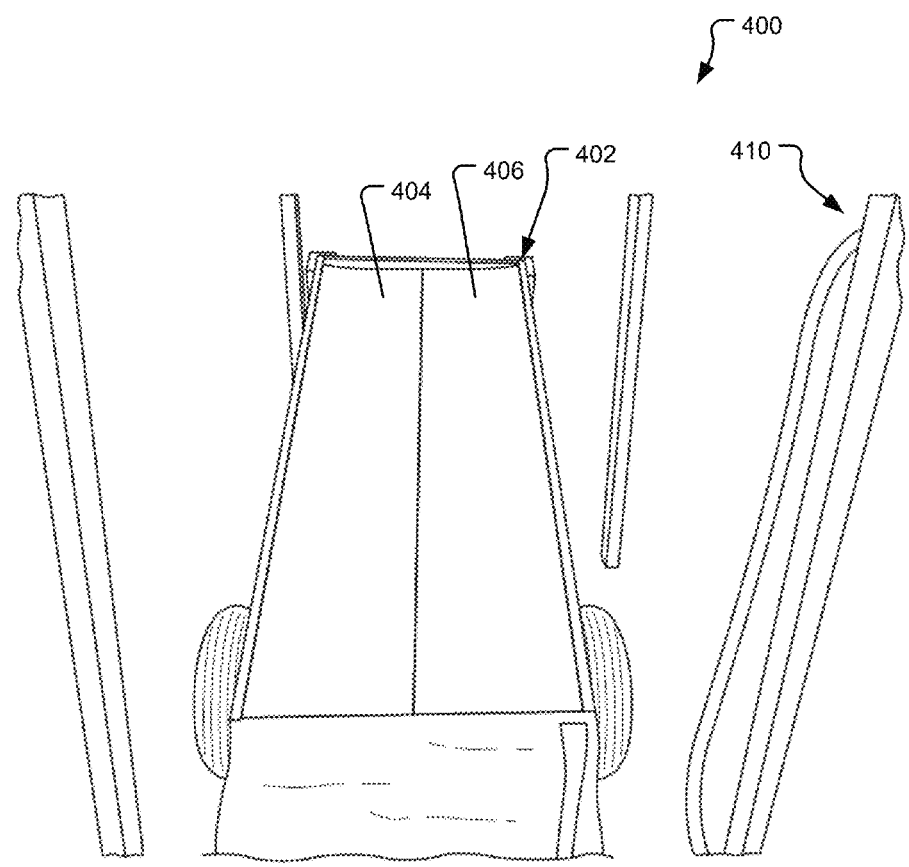
FIG. 5. illustrates a schematic drawing of laboratory test equipment for monitoring water runoff, water absorption, and sediment release of a test bed after simulated rain events.
Figure 6:
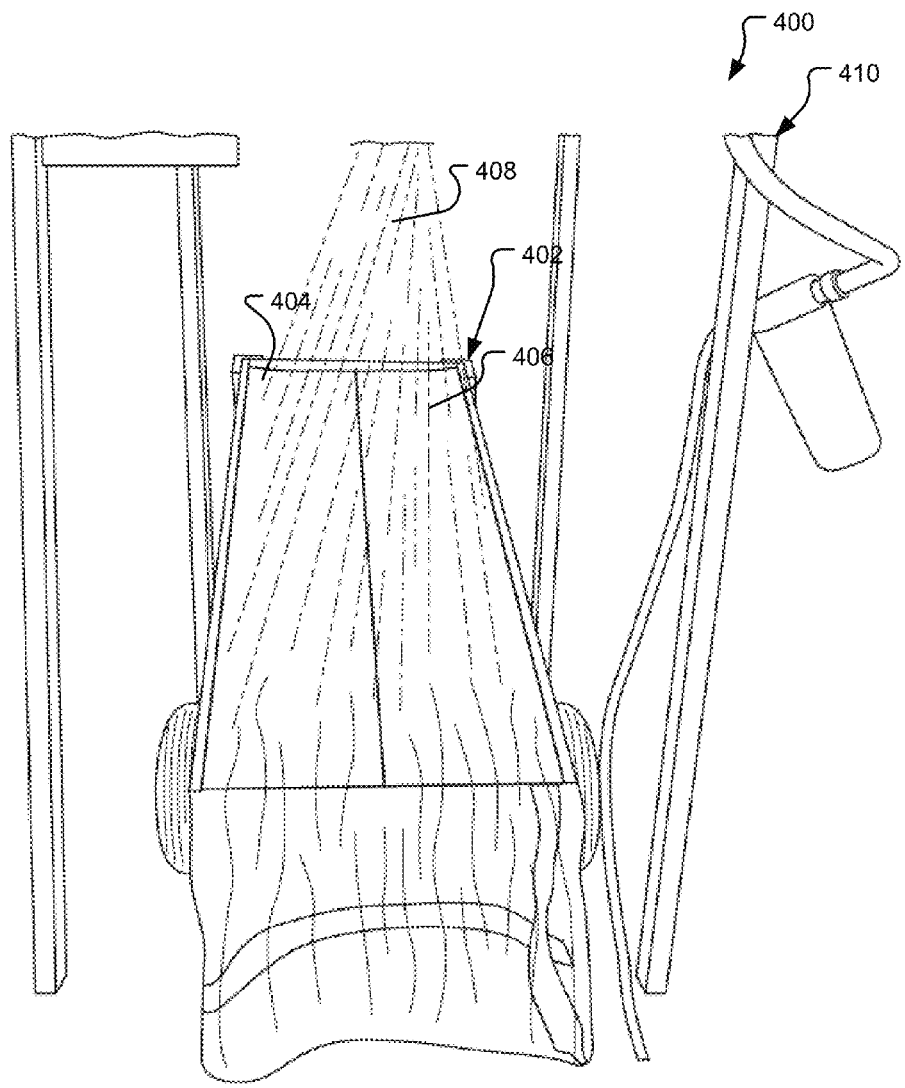
FIG. 6. illustrates a schematic drawing of laboratory test equipment and simulated rain for monitoring water runoff, water absorption, and sediment release of a test bed after simulated rain events.
Figure 7:
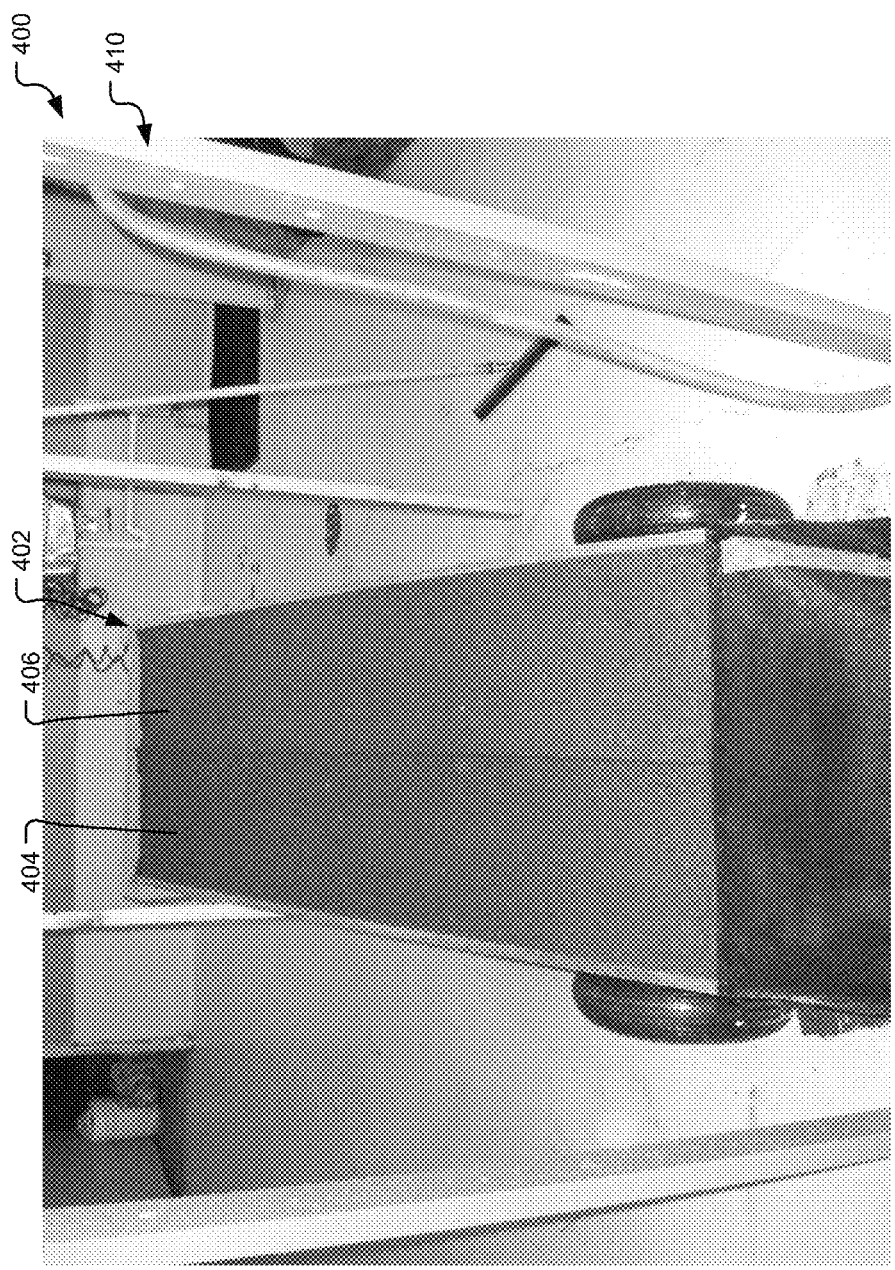
FIG. 7 illustrates a picture of a test bed in position under a rain simulator.
Figure 8:
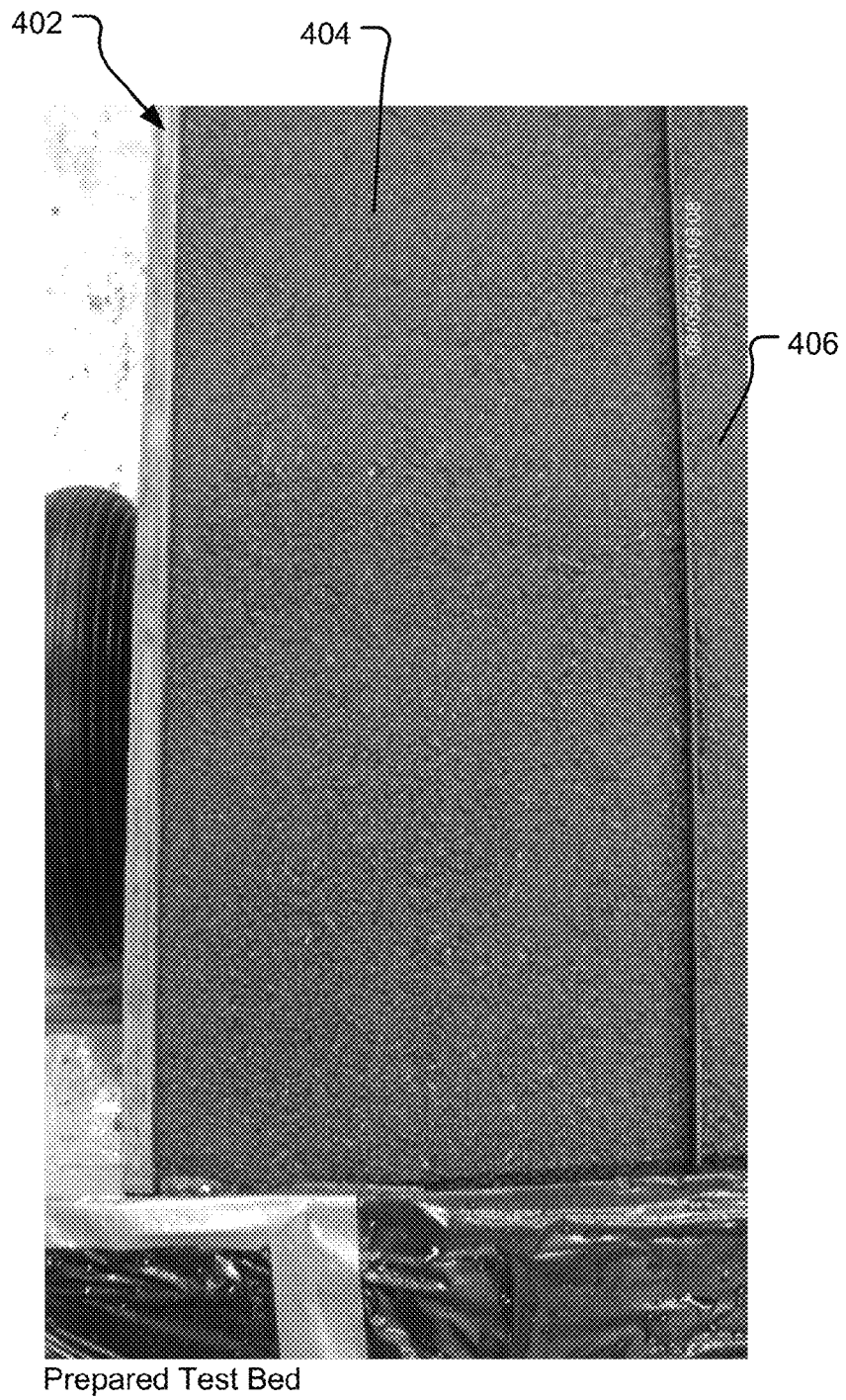
FIG. 8 illustrates a picture of a portion of a test bed.
Figure 9:
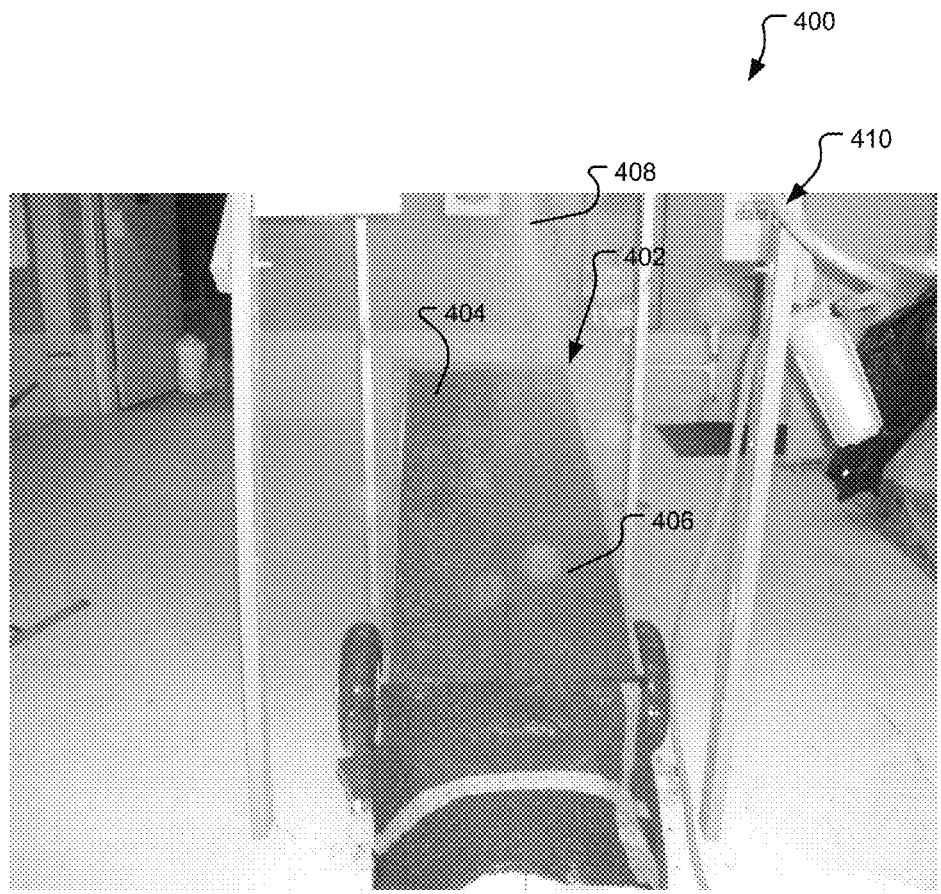
FIG. 9 illustrates a picture of a test bed in position under a rain simulator with simulated rain occurring.
Figure 10:
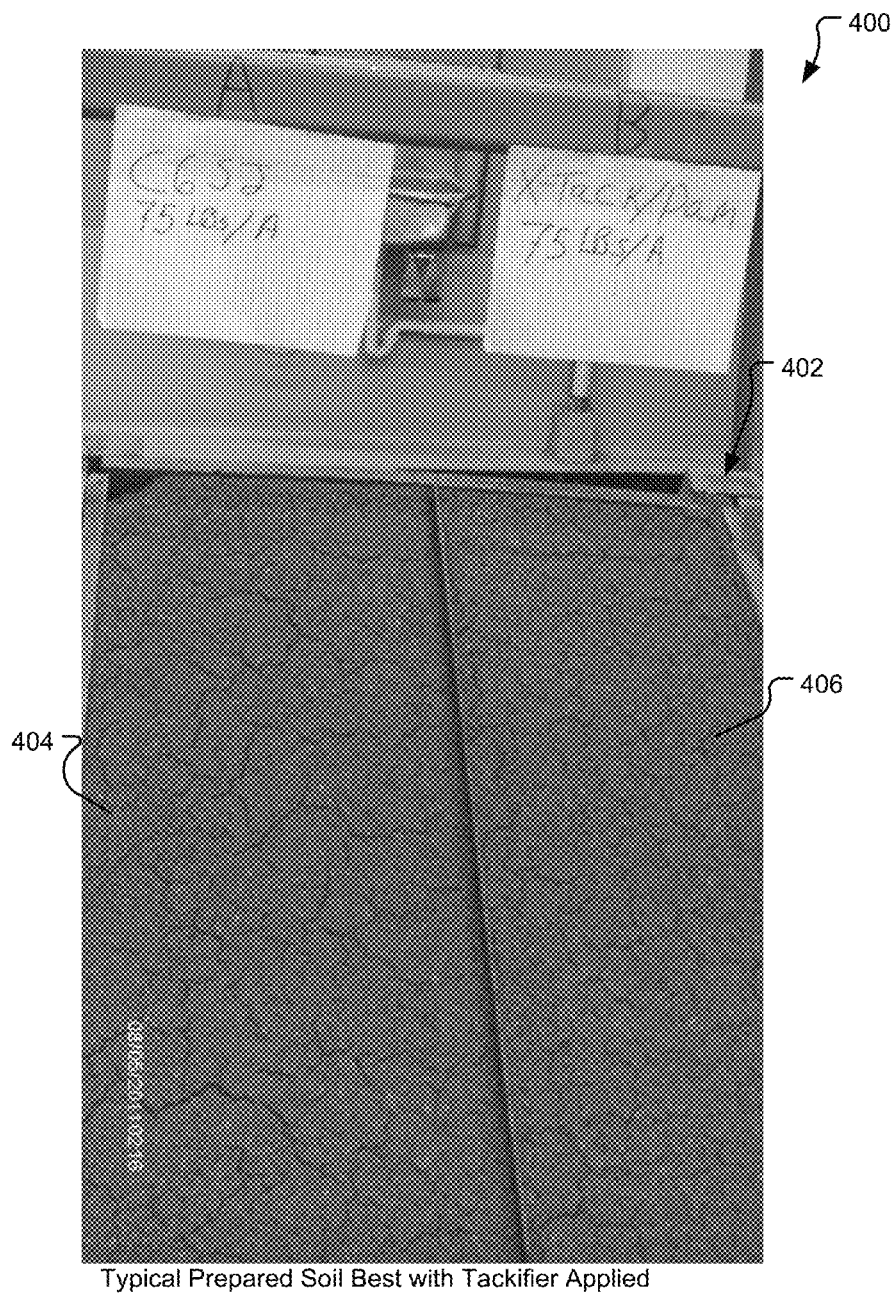
FIG. 10 illustrates a picture of a portion of a typical test bed.

The effectiveness of tackifier compounds to resist rain events and water erosion was tested both in the field and in laboratory settings. FIGS. 5 and 6 illustrate a schematic drawing of the laboratory test equipment 400 used, while FIGS. 7-15 illustrate the actual test beds 402, laboratory test equipment, and results recorded from the different experimental results. The laboratory test equipment consists of an inclined test bed 402 of soil. The test bed 402 is divided into multiple sections 404 and 406 such that run off from each section may be collected separately. Rain is simulated by an overhead spray bar 410 (only partially illustrated in FIGS. 5, 6 7, and 9) that produces droplets 408 approximately the same size as natural rain and oscillates or moves to assure uniform distribution of droplets 408 to the test bed 402. Simulated rain 408 (as illustrated in FIGS. 6 and 9) is applied for a standard length of time. During the simulated rain event, runoff of water and sediment mixture is collected from each discrete bed section or the sections 404 (control solution) and 406 (solution F) as illustrated in FIGS. 11-14. On completion the amount of water and the amount of sediment in the runoff are measured and recorded.

Field testing procedures are conducted to evaluate the tackifier. Ease of mixing, dispersibility, viscosity, spray pattern on application, adhesion to ground surfaces, adhesion to mulch, dried strength, resistance to wind and resistance to rain was evaluated.

As discussed above, FIGS. 7 through 15 demonstrate the testing equipment and results of simulate rain on one instance of the control solution (Table 5) and/or Solution F (Table 4).

The following tables illustrate the water runoff, water absorption and sediment release for control solution (Table 5) and solution F (Table 4). The results of the first, second and third rain events are shown in Tables 6, 7, and 8 illustrated in FIGS. 6-8.

Figure 11:
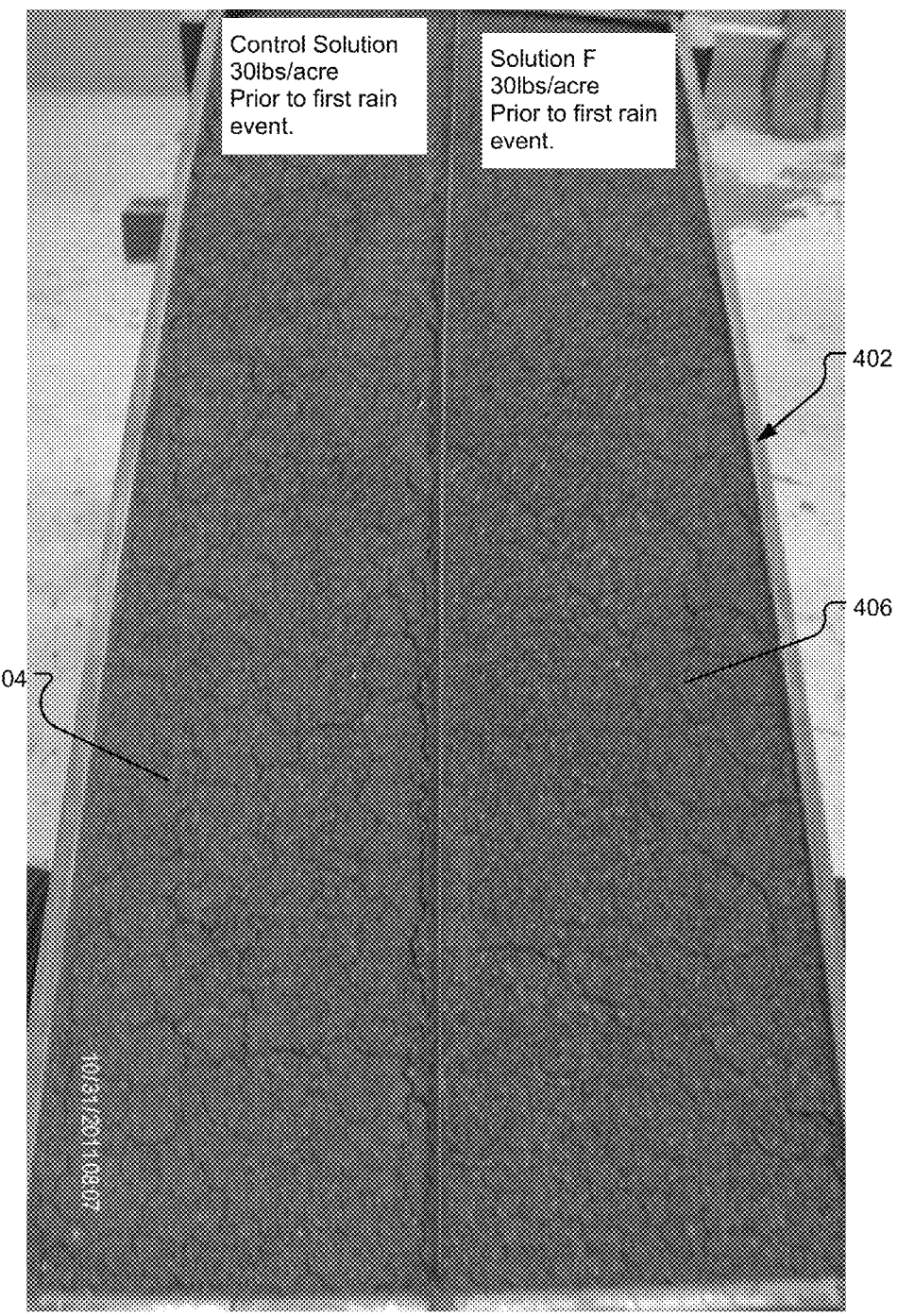
FIG. 11 illustrates a picture of a test bed with a control solution utilized on one side and the Solution F utilized on a second side.

Following application of the solution F (Table 4) and the control solution (Table 5) on the test bed 402 the solutions were allowed to dry on the surface. After drying the resulting test bed 402 is illustrated in FIG. 11.

First Event

Figure 12:
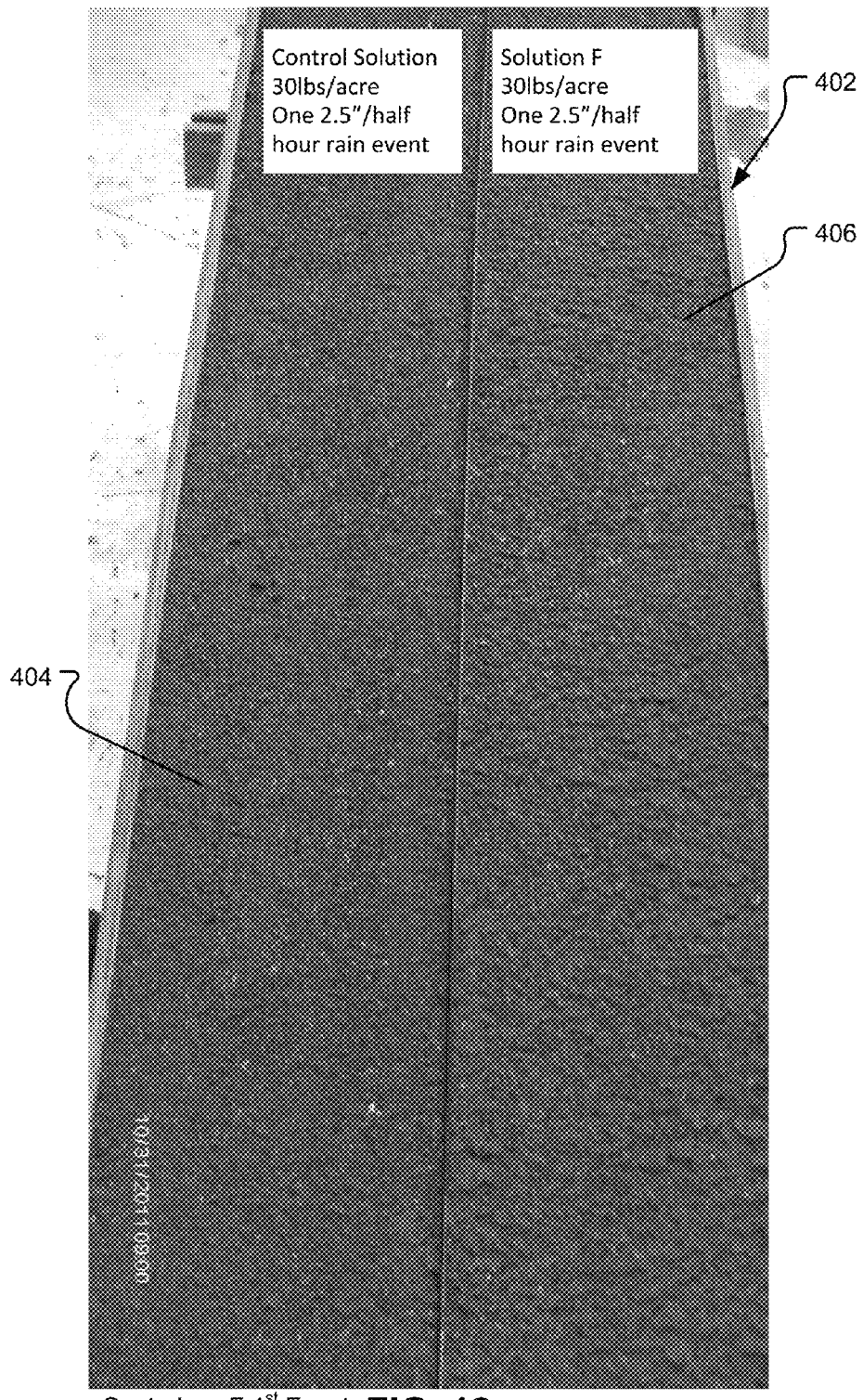
FIG. 12 illustrates a picture of the test bed of FIG. 11 after a first rain event.
Figure 13:
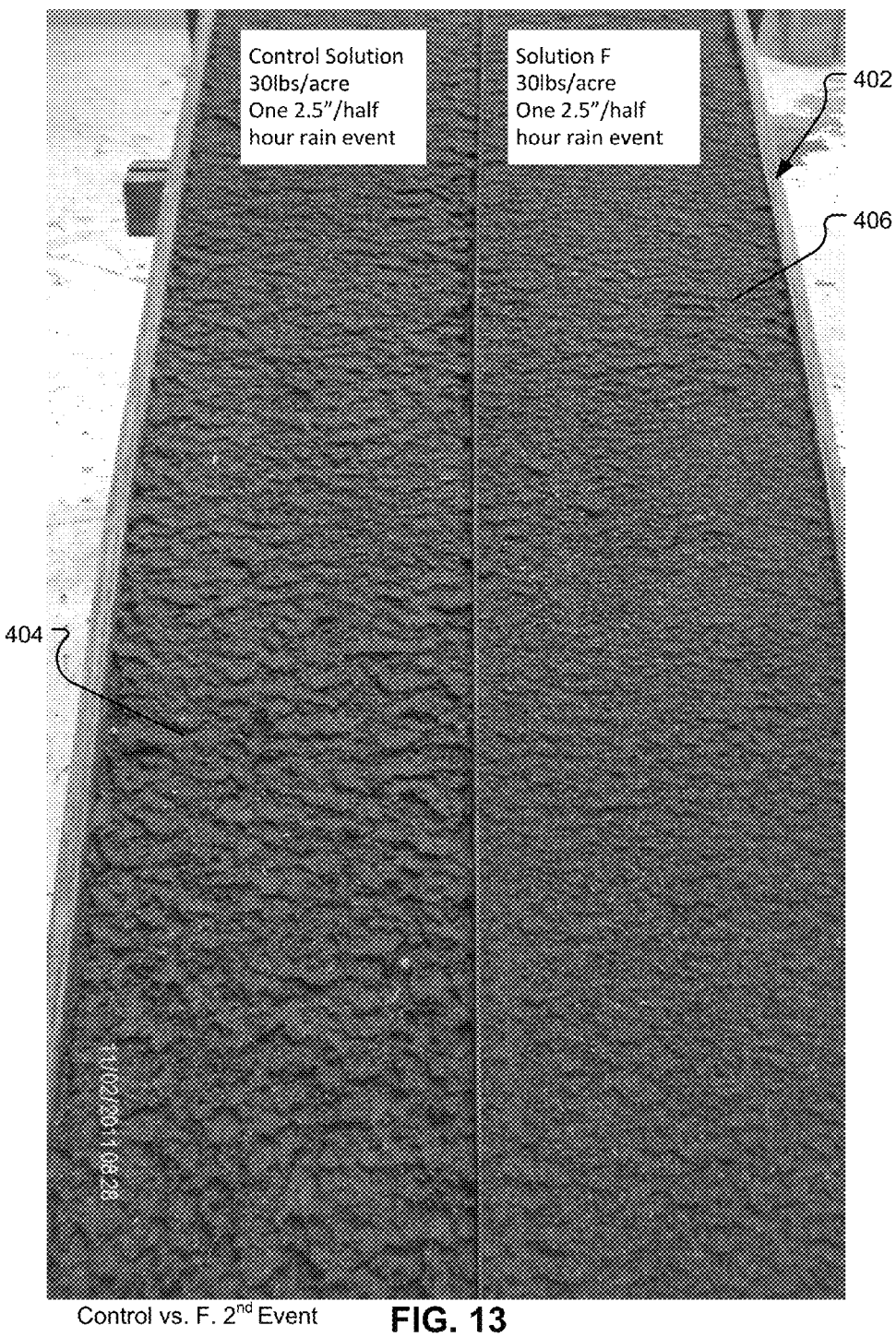
FIG. 13 illustrates a picture of the test bed of FIG. 12 after a second rain event.

A simulated rain event of 2.5" of rain in 30 minutes was applied to the test bed 402. The test bed 402 was elevated to a slope of 2:1. During the course of the rain event water that ran off of each section 404 and 406 was collected and weighed. The insoluble sediment was collected, dried and weighed. The portion treated with solution F allowed 38.59% of the water to runoff while the portion treated the control solution allowed 21.63% of the water to runoff. No sediment escaped from either section 404 and 406. The section 404 treated with the control solution was observed to have more top soil movement than the section 406 treated with solution F as illustrated in FIG. 12. Further, the results for Event 1 are shown in Table 6 illustrated in FIG. 17.

Second Event

The test bed from the first event was allowed to dry for 24 hours and was subjected to a second rain event of equal intensity (2.5" of rain in 30 minutes was applied to the test bed elevated to a slope of 2:1). During this rain event, the water runoff was less on the section 406 treated with solution F than the section 404 treated with the control solution. Sediment runoff was also less on the section 406 treated with solution F, 0.195 grams vs. 0.300 grams from the section 404 treated with the control solution. FIG. 3 shows that a large amount of soil was moving on the section 404 treated with the control solution and much less on the section 406 treated with solution F. Further, the results for Event 2 are shown in Table 7 illustrated in FIG. 18.

Third Event

The test bed surface after the second rain event was allowed to dry for 24 hours and then was subjected to a third rain event of equal intensity to the first two rain events. FIG. 14 shows severe top soil movement including rills in the section 404 treated with the control solution and only very small movement in the section 406 treated with Solution F. The amount of water runoff from the Solution F section 406 was less than the water runoff from the control solution treated section 404. Sediment runoff from the section 404 treated with the control solution was 0.44 grams, 6.3 times as much as the sediment runoff from the section 406 treated with Solution F. Based on these results, Solution F is equal to and/or superior to the control solution as an erosion control solution. The control solution (Table 5) has been an industry standard for many years and is considered to be effective. Therefore, the novel Solution F is also effective and/or even more effective based on the results shown by the control solution.

Rewetting Test

A second test of effectiveness is designated as a film test. A solution of 495 grams of deionized water and 5 grams of F Tackifier (Table 3) were blended in a waring blender at 1800 rpms for 5 minutes. The resulting application solution was aged for 15 minutes. Approximately 19.5 grams of the application solution was added to a glass petri dish. The petri dish simulated a field application of 300 lbs. per acre. The solution was then allowed to dry to a film. After drying, deionized water was added in an amount sufficient to cover the film inside the petri dish. The film was evaluated for resistance to rewetting and cohesiveness at specific times after the addition of water. The results showed that the film of the application solution began to soften and swell from two to five minutes. At sixty minutes the film was no longer intact but possessed a gooey consistency.

A control film made with a similar amount of guar gum (a previously utilized tackifier for erosion control,) instead of the F Tackifier exhibited the same gooey consistency when exposed to deionized water at sixty minutes. However, because the guar gum tackifier is a polysaccharide, the film made with the guar gum tackifier biodegraded and lost its gooey consistence in 36 to 48 hours. In contrast, the film utilizing the F tackifier maintained its gooey consistency for several days longer than 48 hours. The control film has been an industry standard for many years and is considered to be effective. Therefore, the novel film utilizing the F Tackifier is also effective and/or even more effective at resisting rewetting based on the results shown by the rewetting test.

Tensile Strength Test

A third laboratory test, referred to as the tensile strength test, was utilized to test the effectiveness of the tackifier in strengthening the matrix of fiber in the hydraulic mixture. In the tensile strength test, a laboratory mixture of standard wood mulch, tackifier and water is made and allowed to age. The specific formulation was 37 grams fiber, 2.8 grams of F Tackifier and 450 grams water. After aging, the mixture is poured into a drying pan in a thin layer. The mixture is dried to near zero moisture content. After drying the resulting matrix is cut into standard sized coupons. The matrix of fiber, F Tackifier and water was prepared as discussed above creating eight coupons. The coupons are placed in a tensiometer machine and pulled to failure. The force required to pull the coupon to failure is recorded.

This determined the tensile strength of the novel tackifier. In hydraulic application of seeding and mulch, an important property of tackifier and mulch combinations is the ability to bond together in a lasting matrix. This strength test is a way to measure relative tensile strength of a fiber/tackifier mat under controlled conditions.

Rectangular matrices of water, fiber, and tackifier were cast, dried and tensile strength at failure was measured. The ratio of a fiber/tack/and water is used at the same rate as for field applications. Actual field application thickness is too thin to have sufficient strength for laboratory handling; therefore, the pad produce during this test procedure were approximately 3 times the unit mass per unit surface area compared to actual field thickness. During this test, a rate of 2000-lb. fiber per acre and a water ratio of 2 gallons per pound of fiber were fixed.

The tensile strength of cast pads was measured at Specific Adhesion Strength (SAS). The SAS is a way of measuring the fiber to fiber bond produced by the tacking agent. Each pad is weighted in grams and the tensile failure strength in grams is divided by the weight of the pad in grams to calculate the unit-less SAS. The results of the SAS measurements are shown in Table 9 illustrated in FIG. 18.

For this test, the following laboratory apparatuses were utilized: 1. Laboratory balance accurate to 0.01 grams; 2. 500 ml graduate; 3. Air drive paddle mixer; 4. Waring blender with rheostat; 5. Stainless steel beaker (600 ml); 6. Large paddled mixing blade; 7. Lab spoon; 8. Convection oven; 9. Drying tray 9"×13"; and 10. Tensiometer with pad clamps. For this test, the following chemicals and reagents were utilized: 1. Distilled water at 25 degrees Celsius; 2. F Tackifier; 3. Fiber; and 4. Mineral oil.

The convection oven was preheated to 55 degrees Celsius. The desired amount of tackifier and distilled water were measured out. The amounts utilized are shown in Table 9 illustrated in FIG. 18. The mixing blades were attached to the air blender and the stainless steel beaker was placed underneath the air blender. The measured distilled water was poured into the beaker. After the water was poured into the beaker, the blades were turned on. While the blades turned, the measured amount of tackifier was added to the beaker. The desired amount of fiber was measured out. The amount of fiber utilized for this test is shown in Table 9. The fiber was added to the beaker and mixed. A light layer of mineral oil was utilized to coat the drying trays. The tackifier/fiber/water mixture was removed from the mixer after mixing for over 15 minutes starting from when the tackifier was added to the steal beaker. The mixture was poured into the drying trays or the 9"×13" drying trays. The trays were placed in the oven and let to dry overnight. Each matrix was cut into coupons of 101.6 mm×76.2 mm using scissors. Each coupon was weighed as illustrated in Table 9. The weight of the coupons was recorded to the nearest $100^{th}$ of a gram. The pads were placed as far into the clamps as possible and the clamps were firmly tightened. The pad/clamp assembly was attached to the Tensiometer. The Tensiometer was zeroed. Using the handle of the Tensiometer, tension was applied slowly and evenly to the pads until the pads failed. The grams in force from the Tensiometer were recorded from the Tensiometer at the time of failure. Lastly, the average and standard deviation for the tested set of coupons was calculated.

As discussed above, the results of the tests are shown in Table 9 as illustrated in FIG. 18. The mathematical mean SAS for eight coupons was 853 with a standard deviation of 132. In comparison, a SAS for a control coupon made from an equal amount of guar gum in place of the F tackifier had an SAS similar to the SAS of the coupon made with F Tackifier. The control coupon has been an industry standard for many years and is considered to be effective. Therefore, the use of F Tackifier in the coupons is also effective based on the results shown by the tensile strength test.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. As used herein, "about" refers to a degree of deviation based on experimental error typical for the particular property identified. The latitude provided the term "about" will depend on the specific context and particular property and can be readily discerned by those skilled in the art. The term "about" is not intended to either expand or limit the degree of equivalents which may otherwise be afforded a particular value.

Further, unless otherwise stated, the term "about" shall expressly include "exactly," consistent with the discussions regarding ranges and numerical data. Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 4 percent to about 7 percent" should be interpreted to include not only the explicitly recited values of about 4 percent to about 7 percent, but also include individual values and sub-ranges within the indicated range. Thus, included in this numerical range are individual values such as 4.5, 5.25 and 6 and sub-ranges such as from 4-5, from 5-7, and from 5.5-6.5; etc. This same principle applies to ranges reciting only one numerical value. Furthermore, such an interpretation should apply regardless of the breadth of the range or the characteristics being described.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified embodiments and examples. In this regard, any number of the features of the different embodiments described herein may be combined into one single embodiment and alternate embodiments having fewer than or more than all of the features herein described are possible.

While various embodiments have been described for purposes of this disclosure, various changes and modifications may be made which are well within the scope of the present invention. For example, additional constituents such as xanthan gum or other bums may be used in place of some of the starch content depending on the relative economics. Numerous other changes may be made which will readily suggest themselves to those skilled in the art and which are encompassed in the spirit of the disclosure.

What is claimed is:

1. A tackifier formulation, the formulation comprising:
   a modified starch, the modified starch is a vegetable derived starch in dry powder form treated with an enhancer,
   wherein the enhancer is at least a solution containing a borate salt; and
   an acrylamide.

2. The formulation of claim 1 wherein the enhancer also includes a surfactant, a caustic metal hydroxide, a dry organic acid, and a dry flow enhancer.

3. The formulation of claim 2, wherein the solution containing the borate salt further includes water and a heavy alcohol;
- wherein the borate salt is a at least one of borax, sodium metaborate, zinc borate, and boric acid;
- wherein the heavy alcohol is glycerin;
- wherein the surfactant is a polyethylene glycol;
- wherein the caustic metal hydroxide is a calcium hydroxide in a dry powder form;
- wherein the dry organic acid is a fumaric acid blended into the vegetable derived starch until a ratio is reached that provides a pH in a range from about 5.5 to about 7 when the modified starch is added to water; and
- wherein the dry flow enhancer is a micron sized or fumed silica.

4. The formulation of claim 1 wherein the enhancer also includes at least one of a surfactant, a caustic metal hydroxide, a dry organic acid, and a dry flow enhancer.

5. The formulation of claim 1 wherein the solution containing the borate salt is heated to maximize an amount of borate salt solubilized.

6. The formulation of claim 1 wherein the enhancer is a surfactant.

7. The formulation of claim 1 wherein the enhancer is a caustic metal hydroxide.

8. The formulation of claim 1 wherein the enhancer is a dry organic acid.

9. The formulation of claim 1 wherein the enhancer is a dry flow enhancer.

10. The formulation of claim 1 wherein the acrylamide includes a polyacrylamide in dry powder form.

11. The formulation of claim 1 wherein the formulation prevents formation of non-dispersed lumps when mixed in water and the formulation resists rewetting.

12. The formulation of claim 1, wherein the modified starch is about 96% by weight the vegetable derived starch, about 1.45% by weight the water, about 0.54% by weight a glycerin, about 1.00% by weight a sodium metaborate, about 0.1% by weight a calcium hydroxide, about 0.8% by weight a fumaric acid, and about 0.1% by weight a polyethylene glycol.

* * * * *